United States Patent Office 2,767,190
Patented Oct. 16, 1956

2,767,190

HYDROGENATION PROCESS

Joseph Levy, Union, and George A. Bernotsky, Newark, N. J., assignors to Nopco Chemical Company, Harrison, N. J., a corporation of New Jersey No Drawing. Application August 9, 1950, Serial No. 178,550

15 Claims. (Cl. 260—293.2)

This invention relates to a hydrogenation process and more particularly it relates to an improved process for the hydrogenation of piperidone compounds to piperidinol compounds.

Processes for the reduction of piperidone compounds to piperidinol compounds are well known in the art. In these prior art processes the piperidone compounds are hydrogenated in the presence of catalytic agents, such as, platinum oxide or Raney nickel catalyst. McElvain and co-workers have described such a process for the hydrogenation of piperidone compounds to piperidinol compounds in an article published in the J. A. C. S., 70, 1826 (1948). Their process involved the hydrogenation of N-alkyl-4-piperidones in the presence of Raney nickel catalyst to form N-alkyl-4-piperidinols. In their process the piperidone was reacted with hydrogen at about 125° C. and under 140 atmospheres of pressure in the presence of Raney nickel catalyst for a period of about two hours. While it is advantageous to employ Raney nickel catalyst for such a reaction as was disclosed in the above cited article, the McElvain process is carried out at high temperatures and under high pressure, which conditions, of course, necessitate the use of elaborate and therefore costly hydrogenation equipment. Hydrogenation of piperidone compounds in the presence of platinum oxide is also known in the art. However, processes which employ platinum oxide to catalyze hydrogenation reactions are considerably more costly than processes which employ Raney nickel inasmuch as the platinum oxide catalyst is considerably more expensive than the Raney nickel catalyst. Therefore, although the platinum oxide catalyst has proved to be an efficient catalyst in such hydrogenation processes its extensive use in commercial production is prohibited by its cost.

It is the object of our invention to provide an improved process for the hydrogenation of nitrogen-substituted piperidone compounds.

It is a further object of the invention to provide a process for the reduction of nitrogen-substituted piperidone compounds to nitrogen-substituted piperidinol compounds with hydrogen which process can be carried out at room temperature and under relatively low pressure.

Other objects of the invention will in part be obvious and will in part appear hereinafter.

We have discovered that the above and other objects of the invention are readily accomplished by hydrogenating in aqueous, inert alcoholic, or aqueous alcoholic media in the presence of a large amount of Raney nickel catalyst a piperidone compound which has substituted on the nitrogen atom a group selected from the class consisting of alkyl, cycloalkyl, aralkyl and aryl groups. A few illustrative examples of piperidone compounds of this type are N-methyl-4-piperidone, N-ethyl-4-piperidone, N-cyclohexyl-4-piperidone, N-benzyl-4-piperidone, N-phenyl-4-piperidone, etc.

The N-alkyl-4-piperidones employed in the process of the invention can readily be obtained by the cyclization of bis-(beta-carbalkoxyethyl) alkylamines and the subsequent decarboxylation of the N-alkyl-3-carbalkoxy-4-piperidones thus obtained to form the desired N-alkyl-4-piperidones. The other nitrogen-substituted piperidone compounds which can be hydrogenated by our novel process can be obtained in a similar manner.

Raney nickel catalyst and its preparation has been described at great length in the prior art. Its composition has been fully described in U. S. Patent No. 1,628,190 of Raney; in J. A. C. S., 54, 4116 (1932); and in Organic Synthesis, 21, 15 (1941), published by John Wiley and Sons, Inc., New York. Essentially, this catalyst consists of nickel in a finely divided, highly active form. It is prepared by reacting an alloy consisting of about 50% aluminum and 50% nickel with a solution of sodium or potassium hydroxide until the alkali dissolves the aluminum leaving the nickel in the desired state of subdivision. The catalyst is then washed several times with water and is finally stored in water or some other suitable solvent until used.

The outstanding feature of our process is the fact that by carrying out the hydrogenation in the presence of a very large amount of Raney nickel catalyst, we are able to hydrogenate the piperidone compound to the piperidinol compound rapidly at room temperature and at relatively low pressure whereas the prior art procedures have all required the use of high temperatures and high pressures to hydrogenate the piperidones to the piperidinols when Raney nickel was the catalyst. Thus in our process the catalyst is employed in a ratio of at least one part of catalyst for each four parts of piperidone, the weight of the piperidone being calculated as the weight of the piperidone in the form of the free base. Preferably we employ one part of Raney nickel catalyst for each one to two parts of free base. This is a very large amount of catalyst for such a reaction but the process is nevertheless quite economical with regard to the cost of the catalyst since we have found that the catalyst retains substantially all of its activity even after it has been recovered and reused numerous times.

In carrying out our invention we have found it possible to eliminate isolating the nitrogen-substituted piperidone compound prior to the hydrogenation. This is a decided advantage for it is well known in the art that attempts to isolate a nitrogen-substituted piperidone such as an N-alkyl-4-piperidone compound either as the free base or as the hydrochloride salt frequently leads to its decomposition. In our process the free piperidone is never isolated as such. Thus in carrying out the process of our invention, we avoid any undesirable effects which would be occasioned by attempts to isolate the nitrogen-substituted piperidone compounds.

When the hydrogenation is accomplished in an aqueous solution, we prefer to carry it out in the following manner. The bulk of the aqueous acid remaining from the decarboxylation of the sodium enolate salt of the nitrogen-substituted 3-carbalkoxy-4-piperidone is removed from the mixture by distillation until inorganic salts begin to separate. This concentrated mixture is then diluted with water and the pH of the resulting aqueous solution is adjusted to between about 6.0 and 7.0 with an alkali, e. g. NaOH solution. The piperidone is then hydrogenated in the aqueous solution at room temperature and at slightly elevated pressure, i. e. at a pressure of from about 2 to 5 atmospheres, in the presence of a large amount of Raney nickel catalyst. By carrying out the hydrogenation without isolating the piperidone compounds, losses due to decomposition of the piperidone compounds are greatly minimized and excellent yields of the desired piperidinols in a high state of purity are obtained. Prior to carrying out the hydrogenation in the aqueous solution, the pH of the solution is adjusted to from about 6.0 to about 7.0 and preferably to from about 6.5 to 7.0. While reduction of the piperidones takes place readily in accordance with our process at a higher pH in aqueous solution, the yields of piperidinols are diminished because of the occurrence of undesired condensation reactions which the piperidone compounds undergo in aqueous alkaline solution. We have found that the reduction is readily accomplished in neutral or slightly acid aqueous solution and that under such conditions the undesired condensation reactions mentioned above are very greatly minimized. In such solutions the piperidone compounds are present for the most part as the hydrochloride salts. The hydrogenation can be carried out at a slightly lower pH if desired, but it has been found that the rate at which the hydrogenation takes place falls appreciably when the pH is below about 6.0. Also, if desired, the hydrogenation can be carried out at a pH of up to about 8 in which case the piperidone will be present chiefly as the free base. However, at a pH of about 8 or above self-condensation of the piperidone tends to occur in aqueous media and thus cut down the yield.

When the hydrogenation is carried out in aqueous alcoholic media, the procedure and the reaction conditions are the same as when the hydrogenation is carried out in aqueous media. For the purposes of our process, we consider any alcoholic solution containing 20% or more of water as being an aqueous alcoholic solution and one containing less than about 20% of water as being an alcoholic solution.

When the hydrogenation process of the invention is carried out in an inert alcoholic solution, it can be carried out either on the piperidone in the form of the free base or on the hydrochloride salt of the piperidone. When the hydrogenation is to be carried out on the hydrochloride salt, the procedure is analogous to the hydrogenation in an aqueous medium described hereinabove in that the alcoholic solution of the hydrochloride salt is adjusted to a pH of from about 6.0 to 7.0 and preferably to from about 6.5 to 7.0, and then the hydrogenation reaction is conducted. When the piperidone compound is to be hydrogenated in the form of its free base in an inert alcoholic media, the alcoholic solution containing the hydrochloric acid salt of the piperidone is treated with the stoichiometric amount of alcoholic alkali to liberate the free base and then the free base is hydrogenated in the alcoholic solution. In either case whether the reduction is run on the free base or on the hydrochloride salt, the results are very outstanding since the nitrogen-substituted piperidone is very readily hydrogenated in both cases to the corresponding piperidinol compound at room temperature and at relatively low pressure.

In the process of our invention, the hydrogenation of the nitrogen-substituted piperidone compound to the corresponding piperidinol compound is readily carried out in an aqueous medium, in an inert alcoholic medium or in an aqueous alcoholic medium. The inert alcohols which can be employed in the process of the invention are aliphatic alcohols such as methyl alcohol, ethyl alcohol, isopropyl alcohol, butyl alcohol, etc. Those alcohols which are miscible with water may be admixed with water in any proportions as the ratio of alcohol to water is not critical and the same outstanding results are obtained as in those cases in which an entirely aqueous or an entirely alcoholic medium is used. We prefer, however, for economy and simplicity to dissolve the piperidone compound in an aqueous solution and hydrogenate it in the same.

Our novel process is a highly efficient method for reducing alkyl, cycloalkyl, aralkyl and aryl nitrogen-substituted piperidones. The hydrogenation reaction proceeds smoothly and rapidly without the need of elaborate high temperature-high pressure equipment and the alkyl, cycloalkyl, aralkyl or aryl nitrogen-substituted piperidinol is obtained in a high degree of purity. The reaction takes place in approximately the same length of time as is required for the prior art hydrogenation reactions which are carried out at high temperature and at high pressure.

The separation of the piperidinol free base from the hydrogenation reaction mixture when the hydrogenation has been carried out on the hydrochloride salt of the piperidone in either aqueous or aqueous alcoholic media is a relatively simple process. When hydrogenation is complete, the catalyst is removed from the reaction mixture by filtration. The mixture is then acidified to a pH of about 2.0 by means of a mineral acid, e. g. hydrochloric acid, and it is then concentrated by evaporation in vacuo until crystals begin to appear. Then the piperidinol is liberated from its acid salt with an excess of an alkali such as aqueous NaOH, KOH, etc. The free piperidinol readily separates from the aqueous solution if an excess of a concentrated alkali such as 50% NaOH solution is employed. The liberated piperidinol free base is then extracted from the alkaline mixture with any suitable solvent for the base, e. g. a solvent such as butanol or isopropyl acetate.

When the hydrogenation reaction has been carried out upon a substituted piperidone in the form of its free base in an inert alcoholic solution, the separation of the corresponding piperidinol compound is also readily accomplished. After adsorption of hydrogen has ceased, the catalyst is removed from the alcoholic solution by filtration of the solution, and the inert alcohol is distilled from the filtered solution leaving the desired piperidinol in crude form as the residue. The pure piperidinol in excellent yield is then readily obtained by distillation of the crude piperidinol in vacuo.

The outstanding feature of our invention is the fact that by carrying out the hydrogenation in the presence of a very large amount of Raney nickel catalyst, the hydrogenation reaction is readily carried out at room temperature and at low pressure, i. e. at a pressure of from about 2 to 5 atmospheres. Moreover our process substantially eliminates any losses occasioned by decomposition and condensation reactions of the sensitive piperidone compounds since our process does not require that the piperidone compounds be isolated as such. Consequently our process gives excellent yields of the piperidinols in a very high state of purity. In our process, the hydrogenation reaction is preferably carried out at about room temperature although, of course, slightly higher temperatures can be employed, if desired. We prefer to carry out our process at relatively low pressure, i. e. at hydrogen pressures of from 2 to 5 atmospheres, but it can be carried out at slightly elevated pressures, e. g. about 250 to 300 lbs./sq. in., if desired. The use of such very moderate conditions of temperatures and pressure for hydrogenation of nitrogen-substituted piperidone compounds is very highly desirable since the elaborate and expensive equipment required for high temperature-high pressure hydrogenations is unnecessary. Another outstanding feature of our process is the fact that it can be carried out in an aqueous medium. The use of such a solvent is highly desirable from an economic standpoint. Moreover, the high yield of product which we obtain by the process of our invention and the high degree of purity in which we obtain the product make our process much more satisfactory than any of the prior art processes.

For a fuller understanding of the nature and objects of the invention, reference may be had to the following examples which are given merely as further illustrations of the invention and are not to be construed in a limiting sense.

*Example I*

The sodium enolate salt of N-methyl-3-carbomethoxy-4-piperidone obtained by the cyclization of 0.2 mol of bis-(beta-carbomethoxyethyl) methylamine was decarboxylated by refluxing for two hours with 80 cc. of concentrated hydrochloric acid and 70 cc. of water. There-after the bulk of the aqueous acid was removed from the mixture by distillation in vacuo on a steam bath until the inorganic salts, i. e. sodium chloride, began to separate. The mixture was then diluted with 50 cc. of water and the pH of the aqueous solution was then adjusted to about 6.5 with sodium hydroxide solution. Then about 15 grams of Raney nickel catalyst, suspended in water, was admixed with the aqueous solution and the piperidone compound in the aqueous solution then reduced by agitating the aqueous solution in an atmosphere of hydrogen at between about three and about five atmospheres pressure. The reduction was complete in about two hours. The catalyst was then separated from the solution by filtration. The solution was then acidified to a pH of about 2.0 with hydrochloric acid, and then the solution was concentrated by evaporation in vacuo until crystals began to form. The concentrated solution has then admixed with 40 cc. of 50% sodium hydroxide solution and thereby the desired nitrogen-substituted piperidinol was liberated from its hydrochloride salt as an oily material. The sodium chloride which was formed in the reaction was filtered from the solution and then the piperidinol free base was extracted from the solution with two 75 cc. portions and three 50 cc. portions of isopropyl acetate. The combined extracts were dried over sodium sulfate and then the solvent was distilled leaving crude N-methyl-4-piperidinol as the residue. On distillation of this crude product, 19.05 grams of pure colorless N-methyl-4-piperidinol distilling at 106°–108° C. at 27 mm. was obtained. This was a yield of 82.5% of theory assuming 100% purity of the sodium enolate salt of the N-methyl-3-carbomethoxy-4-piperidone and assuming a 100% yield of N-methyl-4-piperidone therefrom.

*Example II*

The procedure of Example I was repeated except that in the decarboxylation step only 65 cc. of concentrated hydrochloric acid and 35 cc. of water were employed. A yield of 17.3 grams or 75% of theory of colorless N-methyl-4-piperidinol distilling at 102°–104° C. at 20 mm. was obtained.

*Example III*

The sodium enolate salt of N-methyl-3-carbomethoxy-4-piperidone prepared by the cyclization of 0.2 mol of bis-(beta-carbomethoxyethyl) methylamine was decarboxylated by refluxing in 150 cc. of about 20% hydrochloric acid for about one hour. The mixture was then evaporated to dryness in vacuo to remove the excess acid and the residual salts were then treated with 100 cc. of isopropanol and again evaporated to dryness. The residue was again taken up in 100 cc. of isopropanol and then treated with a solution of sodium hydroxide in methanol until the mixture was alkaline to phenolphthalein. About 15 grams of Raney nickel catalyst suspended in 50 cc. of isopropanol were then added and the mixture shaken in an atmosphere of hydrogen at about 5 atmospheres pressure. Reduction was complete in about two hours and after filtering off the catalyst, the solvent was evaporated and the product distilled in vacuo giving 16.2 grams of pure N-methyl-4-piperidinol. This yield was 70% of theory, the yield being calculated on the same basis as in Example I.

*Example IV*

The sodium enolate salt of N-ethyl-3-carbomethoxy-4-piperidone prepared by the cyclization of 0.5 mol of bis-(beta-carbomethoxyethyl) ethylamine was decarboxylated by refluxing in 350 cc. of about 20% hydrochloric acid for two hours. The solution was then evaporated to a syrup on a steam bath in vacuo. The residue was taken up in 50 cc. of water and treated with dilute NaOH until the pH was about 6.5–7.0. The neutralized solution of N-ethyl-4-piperidone was then hydrogenated at a pressure of about 4 atmospheres in the presence of about 30 grams of Raney nickel catalyst. After the adsorption of hydrogen had ceased, signifying completion of the reduction, the catalyst was removed by filtration and the solution made strongly alkaline with 50% sodium hydroxide solution. The liberated piperidinol free base was then extracted from the solution with three 100 cc. portions of isopropyl acetate and after drying the combined extracts over sodium sulfate, the solvent was evaporated therefrom. The residual crude N-ethyl-4-piperidinol was then distilled in vacuo giving 36.95 grams of pure N-ethyl-4-piperidinol distilling at 104°–106° C. at 13 mm.

*Example V*

The sodium salt of the keto ester prepared by the cyclization of 0.387 mol bis-(beta-carbomethoxyethyl) isopropylamine was decarboxylated by refluxing with 300 cc. of about 20% hydrochloric acid for four hours. The mixture was then evaporated to a syrup in vacuo. The concentrated solution of the resulting N-isopropyl-4-piperidone was taken up in about 300 cc. of water and the pH of the solution adjusted to 6.5–7.0 with aqueous sodium hydroxide. The aqueous solution was then divided into two equal parts. To the first part was added about 15 grams of Raney nickel catalyst and then the piperidone therein was hydrogenated by agitating the mixture in an atmosphere of hydrogen under a pressure of about 5 atmospheres. The reduction of the piperidone was complete in about two hours after which time the catalyst was removed from the mixture by filtration. To the second portion of the divided aqueous solution there was added the Raney nickel catalyst recovered from the first portion of the divided aqueous solution. The piperidone dissolved in this second portion of the divided aqueous solution was then hydrogenated by agitating the solution in an atmosphere of hydrogen under a pressure of about 5 atmospheres. After absorption of hydrogen had ceased, the catalyst was filtered from the solution and the two solutions containing the desired piperidinol compound were combined. The combined solutions were acidified to a pH of about 2.0 and then evaporated to a syrup from which inorganic salts, i. e. sodium chloride, separated. An excess of 50% aqueous sodium hydroxide solution was then added to the syrup making the solution decidedly alkaline. The desired piperidinol, which was thus converted to its free base, separated from the solution as an oil which oil was removed from the solution by extracting the solution three times with 100 cc. portions of isopropyl acetate. The combined isopropyl acetate extracts containing the piperidinol compound were then dried over sodium sulfate and the solvent then removed by evaporation. The crude piperidinol free base which remained was distilled in vacuo giving 46.45 grams of the desired N-isopropyl-4-piperidinol. It was a colorless viscous liquid distilling at 110°–111° C. at 12 mm. The yield was 84% of theory calculated on the assumption that the sodium enolate salt of the keto ester employed as the starting material had been of 100% purity and that a 100% yield of N-isopropyl-4-piperidone had been obtained by the decarboxylation of the keto ester.

This application is a continuation-in-part of our co-pending application Serial No. 118,712 filed September 29, 1949.

Having described our invention what we claim as new and desire to secure by Letters Patent is:

1. In a process for the hydrogenation of a nitrogen-substituted piperidone compound, the substituted group of which is selected from the class consisting of alkyl, cycloalkyl, aralkyl, and aryl groups, the improvement which comprises dissolving the piperidone compound in a solvent selected from the group consisting of water, inert aliphatic alcohols, and mixtures of water and water-miscible aliphatic alcohols, and hydrogenating the piperidone compound in the solvent in the presence of at least about one part of Raney nickel catalyst for each four parts of the piperidone compound, said hydrogenation being effected at about room temperature and under a hydrogen pressure of from about 2 to about 20 atmospheres.

2. In a process for the hydrogenation of an N-alkyl-4-piperidone to an N-alkyl-4-piperidinol, the improvement which comprises dissolving the N-alkyl-4-piperidone in a solvent selected from the group consisting of water, inert aliphatic alcohols, and mixtures of water and water-miscible aliphatic alcohols, and hydrogenating the piperidone compound in the solvent in the presence of at least about one part of Raney nickel catalyst for each four parts of the piperidone compound, said hydrogenation being effected at about room temperature and under a hydrogen pressure of from about 2 to about 20 atmospheres.

3. In a process for the hydrogenation of N-methyl-4-piperidone to N-methyl-4-piperidinol, the improvement which comprises dissolving the N-methyl-4-piperidone in the form of its hydrochloride salt in water and hydrogenating the piperidone in the water in the presence of at least about one part of Raney nickel catalyst for each four parts of the piperidone compound said hydrogenation being effected at about room temperature and under a hydrogen pressure of from about 2 to about 20 atmospheres.

4. In a process for the hydrogenation of N-methyl-4-piperidone to N-methyl-4-piperidinol, the improvement which comprises dissolving the N-methyl-4-piperidone in the form of its hydrochloride salt in aqueous isopropyl alcohol and hydrogenating the said piperidone in the aqueous alcohol in the presence of at least about one part of Raney nickel catalyst for each four parts of piperidone compound, said hydrogenation being effected at about room temperature and under a hydrogen pressure of from about 2 to about 20 atmospheres.

5. In a process for the hydrogenation of N-ethyl-4-piperidone to N-ethyl-4-piperidinol, the improvement which comprises dissolving the N-ethyl-4-piperidone in the form of its hydrochloride salt in water and hydrogenating the piperidone in the water in the presence of at least about one part of Raney nickel catalyst for each four parts of the piperidone compound, said hydrogenation being effected at about room temperature and under a hydrogen pressure of from about 2 to about 20 atmospheres.

6. In a process for the hydrogenation of N-methyl-4-piperidone to N-methyl-4-piperidinol, the improvement which comprises dissolving the N-methyl-4-piperidone in isopropyl alcohol and hydrogenating the piperidone in the alcohol in the presence of at least about one part Raney nickel catalyst for each four parts of the piperidone compound, said hydrogenation being effected at about room temperature and under a hydrogen pressure of from about 2 to about 20 atmospheres.

7. The process of claim 1 wherein at least about one part of Raney nickel catalyst is employed for each two parts of piperidone compound present and wherein the hydrogenation is carried out at about room temperature and under a hydrogen pressure of from about 2 to 5 atmospheres.

8. The process of claim 2 wherein at least about one part of Raney nickel catalyst is employed for each two parts of piperidone compound present and wherein the hydrogenation is carried out at about room temperature and under a hydrogen pressure of from about 2 to 5 atmospheres.

9. A process for producing an N-alkyl-4-piperidinol which comprises dissolving the corresponding N-alkyl-4-piperidone in the form of its hydrochloride salt in water, adjusting the pH of the solution to 6.0–7.0, and then hydrogenating the piperidone compound in the water in the presence of at least about one part of Raney nickel catalyst for each four parts of the piperidone compound, said hydrogenation being effected at about room temperature and under a hydrogen pressure of from about 2 to about 20 atmospheres.

10. The process of claim 9 wherein N-methyl-4-piperidone is converted to N-methyl-4-piperidinol.

11. The process of claim 9 wherein N-ethyl-4-piperidone is converted to N-ethyl-4-piperidinol.

12. A process for producing an N-alkyl-4-piperidinol which comprises dissolving the hydrochloride salt of an N-alkyl-4-piperidone in an inert aliphatic alcohol, treating the resulting solution with an alkali and thus liberating the piperidone free base from the salt, and then hydrogenating the piperidone in the presence of at least about one part of Raney nickel catalyst for each four parts of piperidone, said hydrogenation being effected at about room temperature and under a hydrogen pressure of from about 2 to about 20 atmospheres.

13. The process of claim 12 wherein N-methyl-4-piperidone is hydrogenated in isopropyl alcohol.

14. The process of claim 9 wherein at least about one part of Raney nickel catalyst is employed for each two parts of piperidone compound and wherein the hydrogenation is carried out at about room temperature and under a hydrogen pressure of from about 2 to 5 atmospheres.

15. The process of claim 12 wherein at least about one part of Raney nickel catalyst is employed for each two parts of piperidone compound and wherein the hydrogenation is carried out at about room temperature and under a hydrogen pressure of from about 2 to 5 atmospheres.

References Cited in the file of this patent

UNITED STATES PATENTS

| | | |
|---|---|---|
| 1,695,666 | Schurmacher et al. | Dec. 18, 1928 |
| 1,980,638 | Scheuing et al. | Nov. 13, 1934 |
| 2,018,680 | Lazier | Oct. 29, 1935 |
| 2,477,842 | Wenner | Aug. 2, 1949 |

FOREIGN PATENTS

| | | |
|---|---|---|
| 485,139 | Germany | Oct. 31, 1929 |
| 520,201 | Great Britain | Apr. 17, 1940 |

OTHER REFERENCES

Cook et al.: Jour. Chem. Soc. (London) 1945, pp. 399–402.

McElvain et al.: Jour. Amer. Chem. Soc., vol. 68 (1946), pp. 1049–57.

McElvain et al.: Jour. Amer. Chem. Soc., vol. 70 (1948), pp. 1826–28.

Craig et al.: Jour. Amer. Chem. Soc., vol. 71 (1949), pp. 465–7, 904.

Urgyumov Comp. Rend. Acad. Sci. (U. S. S. R.), vol. 29 (1940), pp. 48–52; Chem. Abstr., vol. 35 (1941), p. 3644.

Dankova et al.: J. Gen. Chem. (U. S. S. R.), vol. 11 (1941), pp. 934–8; Chem. Abstr., vol. 37 (1943), p. 381.

Chem. Abst., vol. 24, p. 1863.

Chem. Abst., vol. 40, pp. 5736–7 (1946).

Chem. Abst., vol. 43, p. 4275 (1949).